FLUX SWITCH PROTECTIVE SYSTEM FOR ELECTRICAL APPARATUS
Filed Sept. 29, 1966
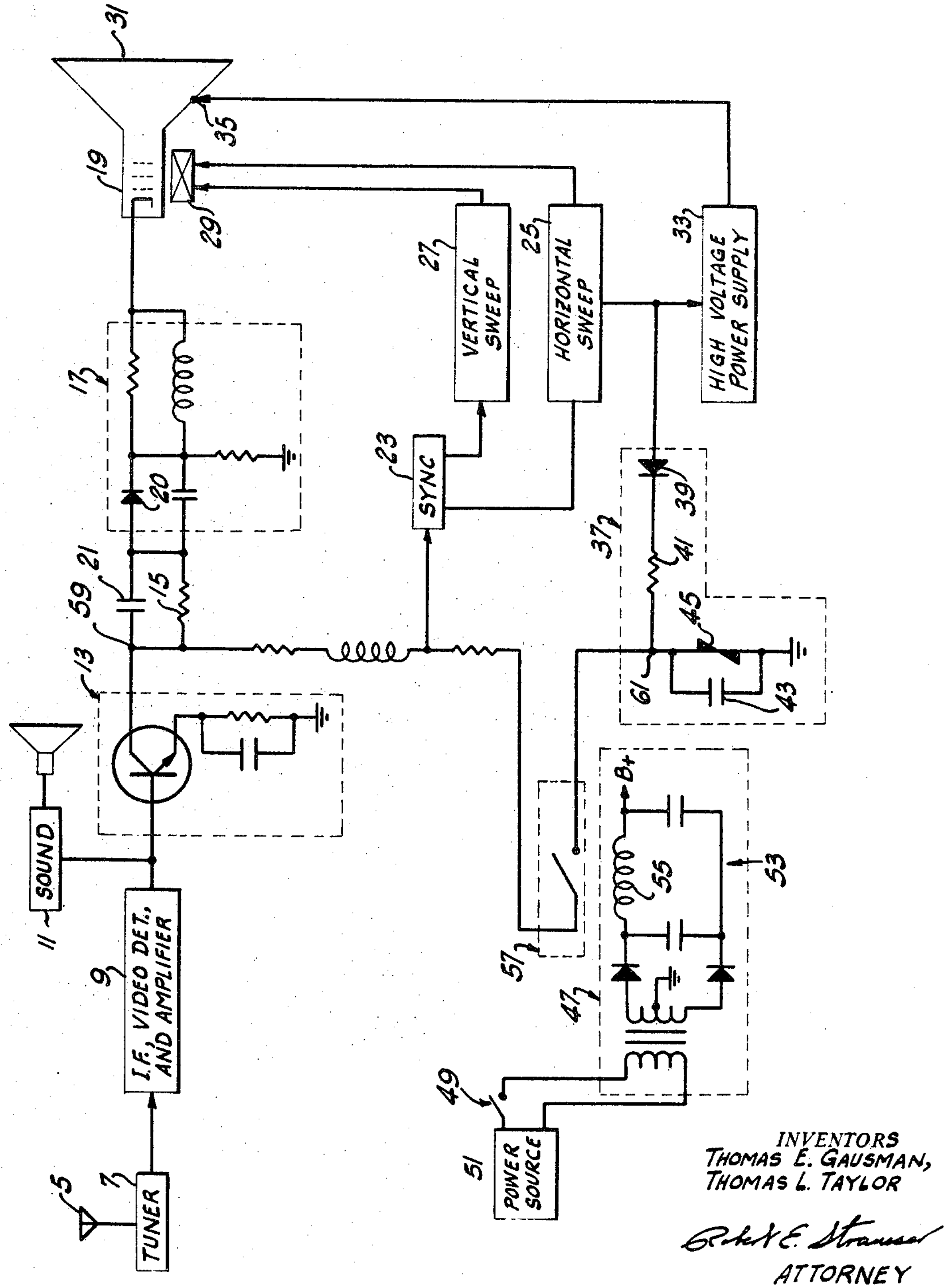
INVENTORS
THOMAS E. GAUSMAN,
THOMAS L. TAYLOR
ATTORNEY

United States Patent Office 3,402,316

Patented Sept. 17, 1968

3,402,316

FLUX SWITCH PROTECTIVE SYSTEM FOR ELECTRICAL APPARATUS

Thomas E. Gausman and Thomas Lester Taylor, Batavia, N.Y., assignors to Sylvania Electric Products Inc., a corporation of Delaware Filed Sept. 29, 1966, Ser. No. 582,804
5 Claims. (Cl. 315—20)

ABSTRACT OF THE DISCLOSURE

In a television receiver an electrical apparatus protective system includes a television signal source having a video output stage D.C. coupled via a D.C. restoration stage to a display device and a first power supply means including an inductive filter means coupled to the signal source a video power supply means is responsive to the first power supply means and a magnetic flux responsive switching means electrically couples the video power supply means to the junction of the video output stage and D.C. restoration stage and a magnetic flux responsive relationship to the inductive filter means.

This invention relates to a protection system for electrical apparatus and more particularly to protection systems employing a magnetic flux dependent switching means.

In electrical appartus employing multiple interdependent power supplies utilizing a single power source as a means of energization, it has been customary to merely provide a switch for connecting and disconnecting the power source. While such systems are perfectly adequate for many types of electrical apparatus, it has been found that numerous other types of electrical apparatus require special protective circuitry to prevent the application of undesired high potentials which permanently damage the apparatus.

More specifically, one particular form of electrical apparatus which employs multiple interdependent power supplies is a television receiver. In television receivers wherein the display device or cathode ray tube is A.C. coupled to a signal source which is energized by both a low voltage supply and a video voltage supply, it has been found that a protective system is not a necessity since the D.C. component of the signal is lost by the blocking action of the coupling capacitor and the energy of the electron beam has a path for rapid dissipation when the receiver is disconnected from the power source.

However, it has also been found that television receivers entirely dependent upon A.C. coupling of the signal source to the display device leave much to be desired with respect to a true rendition of the scene viewed by a television camera because of the fact that the D.C. component which ideally is an accurately scaled reproduction of the light values seen by the camera, is undesirably removed and the black level is not maintained at the picture tube cut-off level but rather at a level which tends to shift in accordance with the average video signal valve which is dependent upon the scene viewed by the camera.

On the other hand, television receivers employing D.C. coupling tend to faithfully reproduce the light values viewed by the television camera. However, the utilization of multiple interdependent power supplies in such receivers tends to present a highly undesirable condition wherein the center portion of the viewing screen of the cathode ray tube is burned and permanently damaged.

More specifically, it has been found that television receivers wherein a video signal is D.C. coupled to a display device and wherein a single switch is employed to disconnect one of a plurality of interdependent power supplies from a power source are undesirably troubled with the problem of burned and permanently damaged center portions of the display device. When the switch is thrown interrupting power applied from the power source, the receiver components including the electron beam scanning system of the display device are rapidly rendered inoperative. Thereupon, the normal path for current flow and discharge of a second power supply is interrupted causing a relatively rapid and undesirable rise in the potential of the second power supply. Since the components normally providing a path for rapid decrease of the above-mentioned increased potential of the second power supply and scanning system of the display device have already been rendered inoperative, the increased potential of the second power supply very slowly decreases and the beam current of the display device is very gradually dissipated at the center of the viewing screen. The undesired and intolerable result is a burned and permanently damaged spot at the center of the viewing screen of the display device.

One known approach for overcoming the above-mentioned problem is the provision of a dual line switch wherein one section is utilized to disconnect the first power supply from the power source and a second section of the switch disconnects the second power supply from the cathode ray tube and prevents the previously discussed increased potential from reaching the cathode of the cathode ray tube thereby eliminating the necessity of increased energy dissipation by the electron beam of the cathode ray tube.

However, it has been found that such an approach leaves much to be desired for a number of reasons. For example, the protective system provided by the second section of the dual switch is dependent upon activation of the switch to the "off" position. Thus, this dual switching protective system is rendered ineffective whenever the applied power is interrupted by any means other than activation of the switch. For instance, disconnecting the power source by removing the line cord interrupts the power source without activating the dual switch. Also, any interruption of power available at the source renders the dual switching protective system ineffective since the second section of the dual switch is not activated and the second power supply is not disconnected from the cathode ray tube or display device.

Therefore, it is an object of this invention to provide an enhanced protective system for electrical apparatus employing multiple power supplies.

Another object of the invention is to provide an enhanced protective system for electrical apparatus employing multiple power supplies which is automatically responsive to power applied from a source.

Still another object of the invention is to provide a magnetic flux dependent protection system for electrical apparatus employing multiple interdependent power supplies.

A further object of the invention is to provide a magnetic flux dependent protection system for a television receiver employing multiple interdependent power supplies which is automatically responsive to the power applied to the receiver.

These and other objects are achieved in one aspect of the invention by electrical apparatus which includes a first and second power supply means and a magnetic flux responsive switch actuable to electrically connect and disconnect the second power supply means from the apparatus in accordance with the power applied to the first power supply means.

For a better understanding of the present invention, together with other and further objects, advantages, and capabilities thereof, reference is made to the following disclosure and appended claims in connection with the accompanying drawing illustrating a television receiver employing one particular embodiment of the invention.

Referring to the drawing, the television receiver includes the usual antenna 5 for intercepting transmitted television signals and coupling these intercepted signals to a tuner 7 including the customary RF amplifier, mixer, and oscillator. The output signal from the tuner 7 is coupled to a video channel 9 wherein the IF signals are amplified and video signal detected and amplified and applied to the usual sound channel 11 and a video output stage 13.

The video signals available from the output stage 13 are DC coupled via the series connected resistor 15 and DC preservation stage 17 to the cathode of a cathode ray tube 19. Also, the video signals from the output stage 13 are AC coupled via a series connected capacitor 21 and the DC preservation stage 17 to the cathode of the cathode ray tube 19.

Moreover, undesired excessive beam current in the cathode ray tube 19 is prevented by the unidirectional conduction device 20 which responds to a predetermined increased level of beam current to render the DC coupling inoperative. Thus, undesired blooming, defocusing, and similar defects apparent to a viewer are prevented.

Further, the video signals from the output stage 13 are applied to a synchronizing channel 23 wherein the synchronizing pulses are separated from the video signals and applied to and control the operation of the vertical and horizontal sweep circuitry, 25 and 27 respectively. In turn, the horizontal and vertical sweep circuitry develop potentials suitable for application to deflection apparatus 29 associated with the cathode ray tube 19 to cause both horizontal and vertical scanning of the viewing screen 31 of the cathode ray tube 19 by an electron beam.

The output signal available from the horizontal sweep circuitry 25 is also applied to a high voltage power supply 33 wherein high voltage potentials are developed and applied to the second anode 35 of the cathode ray tube 19. Further, the horizontal sweep circuitry 25 provides an output potential which is applied to a video power supply 37. The video power supply 37 includes a series connected unidirectional conduction device 39, a potential dropping resistor 41, and a parallel connected capacitor 43 and voltage dependent resistor 45 connected to circuit ground.

The receiver also includes a first or low voltage power supply 47 which is connected via an "on-off" switch 49 to a power source 51. This power supply 47 includes a filter network 53 having an inductive means 55 and operates in a well-known manner to provide relatively low potentials for other stages of the receiver.

Disposed in flux-linking relationship to the inductive means 55 of the low voltage power supply 47 is a magnetic flux responsive switching means 57. This switching means 57, which may be any one of a number of magnetic flux responsive relays and devices and is preferably in the form of a reed relay device, is electrically connected intermediate the junction 59 of the video power supply 37 and the junction 61 of the DC coupled video output stage 13 and the DC preservation stage 17.

In order to more clearly explain the desirable features of the above-described embodiment of an enhanced protective system, an explanation will first be made of an assumed condition wherein the magnetic flux responsive switching means 57 is not included in the circuitry. In other words, it will be assumed that the video power supply 37 is directly coupled to the junction 59 of the video output stage 13 and the DC preservation stage 17.

Under this assumed undesirable condition, it can readily be understood that an interruption in the power applied to the low voltage power supply 47 from the power source 51 will cause a relatively rapid dissipation of the scanning potentials applied to deflection apparatus 29 of the cathode ray tube 19. As a result, an electron beam scanning the viewing screen 31 will assume a substantially fixed position at the aproximate center of the viewing screen 31. Also, an interruption of the potentials available from the low voltage supply 47 will cause a discontinuance of the video signal normally applied to the video output stage 13 which, in turn, will prevent or at least greatly inhibit current flow therethrough.

Because the path for current flow through the video output stage 13 has been interrupted, the potential drop normally occurring across the resistor 41 of the second or video power supply 37 will not occur. Thus, the potential appearing at the junction 61 of the power supply 37 and at the junction 59 will rise to the full potential value normally available at the unidirectional conduction device 39. Moreover, the relatively large storage capacitor 43 of the second or video power supply 37 will tend to maintain this undesirable and relatively high potential at the junction 59.

Since the relatively high potential appearing at the junction 59 is directly connected to the electron device of the video output stage 13, it can be readily understood that permanent and catastrophic damage to the video output stage 13 is not only possible but also probable. Further, the inoperativeness of the video output stage 13 prevents rapid dissipation therethrough of the increased potential and energy appearing at the junction 59. Thus, this increased potential is very gradually decreased and the electron beam energy is very gradually dissipated at a substantially fixed position at the approximate center of the viewing screen 31. Obviously, the result is undesired burning and permanent damage to the viewing screen 31.

However, it has been found that the above-described highly undesirable conditions are readily eliminated by the inclusion of a magnetic flux responsive switching means 57 in flux-linking relationship to the first or low voltage power supply 47 and electrically connected intermediate the second or video power supply 37 and the junction 59 of the television receiver. Moreover, any magnetic flux available in the first or low voltage power supply 47 is applicable and appropriate and a preferred source is the "stray" magnetic flux available from the inductive means 55 normally present in the filter network 53.

As to the operation, the application of power from a power source 51 to the first or low voltage supply 47 causes current flow through and development of "stray" magnet flux by the inductive means 55 of the filter network 53. Thereupon, the magnetic flux responsive switching means 57, which is disposed in flux-linking relationship to the inductive means 55, is activated electrically connecting the second or video power supply 37 to the junction 59 of the DC coupled video output stage 13 and DC preservation stage 17.

Now, an interruption of the power applied to the first or low voltage power supply 47 will cause a rapid collapse of the flux linkages available from the inductive means 55. As a result, the magnetic flux responsive switching means 57 will rapidly electrically disconnect the second or video power supply 37 from the junction 59 of the DC coupled video output stage 13 and the DC preservation stage 17. As a result, a rise in potential and energy at the junction 59 is prevented, which in turn, eliminates the application of undesired high potentials to the video output stage 13 and undesired dissipation of energy by the electron beam causing permanent damage to the center of the viewing screen 31 of the cathode ray tube 19.

Thus, there has been provided an enhanced and unique protective system for electrical apparatus employing multiple power supplies. The system not only serves to protect the electrical apparatus under normal operational conditions but also provides automatic protection for the electrical apparatus under unusual and unexpected circumstances. For example, unexpected failure of the power source or disregard for the normal "on-off" switching arrangements normally associated with electrical apparatus are of no consequence and have no deleterious effect upon the electrical apparatus due to the automatic features of the system. Moreover, the protective system is economical, simple, readily adapted to existing apparatus, and provides numerous other advantages which are believed to be unattainable in any known system.

While there has been shown and described what is at present considered the preferred embodiment of the invention, it will be obvious to those skilled in the art that various changes and modifications may be made therein without departing from the invention as defined by the appended claims.

What is claimed is:

1. An electrical apparatus protective system comprising in combination:
   - a signal source;
   - a display device DC coupled to the signal source;
   - a first power supply means coupled to the signal source, said supply including an inductive filter means;
   - a second power supply means responsive to said first power supply, and
   - magnetic flux responsive switching means electrically coupling said second power supply to the junction of said DC coupled signal source and display device and contiguous with said inductive filter means whereby said second power supply means is electrically connected and disconnected from said junction of said DC coupled signal source and display device in response to energization and de-energization respectively of said first power supply means.

2. The combination of claim 1 wherein said magnetic flux responsive switching means is in the form of a reed switch relay.

3. In a television receiver, an electrical apparatus protective system comprising in combination:
   - a source of television signals including a video output stage;

- a display device for developing an electron beam DC coupled to said video output stage;
   - a first power supply means coupled intermediate a power source and said television signal source, said means including an inductive filter means;
   - video power supply means responsive to said first power supply means; and
   - magnetic flux responsive switching means electrically coupling said video power supply means to the junction of said DC coupled video output stage and display device and in magnetic flux responsive relationship to said inductive filter means of said first power supply means whereby said video power supply means is electrically connected and disconnected in response to energization and deenergization of said first power supply means.

4. The combination of claim 3 wherein said switching means is in the form of a reed relay device.

5. The combination of claim 3 wherein said inductive filter means is in the form of a choke coil providing stray magnetic flux upon energization of said first power supply means and said switching means is in the form of a reed relay device in continguous relationship with said inductive filter means.

References Cited

UNITED STATES PATENTS

| | | | |
|---|---|---|---|
| 2,098,384 | 11/1937 | Goodrich | 315—20 |
| 2,222,426 | 11/1940 | White et al. | 315—20 |

RODNEY D. BENNETT, *Primary Examiner.*

B. L. RIBANDO, *Assistant Examiner.*